UNITED STATES PATENT OFFICE.

ERNST F. W. WIEDA, OF PATERSON, NEW JERSEY.

PROCESS OF TREATING MILK AND MILK PRODUCTS.

1,092,616.  Specification of Letters Patent.  Patented Apr. 7, 1914.

No Drawing.  Application filed August 2, 1912. Serial No. 712,898.

*To all whom it may concern:*

Be it known that I, ERNST F. W. WIEDA, a citizen of the United States, residing at Paterson, in the county of Passaic and State of New Jersey, have invented certain new and useful Improvements in the Process of Treating Milk and Milk Products, of which the following is a specification.

According to a well-known method of treating dried milk or milk powder with a view to rehabilitate the milk as liquid milk a mixture of the powder, butter and water in a certain proportion is first thoroughly agitated at a suitable temperature (say, 120° F.) for a sutiable time (say, 30 to 40 minutes); secondly, the temperature being appreciably reduced (to say 100° F., or not less than 95° F.), the mixture is again agitated for a suitable length of time; thirdly, the mixture is forced through a restricted orifice or otherwise subjected to pressure at from 150 to 250 on a kilogram gage, which again raises its temperature, to approximately 110° F.; and, finally, the mixture is cooled to and retained until used at 35° F. The first step, including agitation and sufficient heat for the purpose, produces the melting and breaking up of the butter into fat particles and their diffusion throughout the liquid; the second or "tempering" step continues the diffusion phase of the first step under a temperature condition lowered where the specific gravity of the butter is such as to advance the diffusion to as perfectly uniform state as possible; the third, known as the "emulsifying" or "homogenizing", step gives the emulgent character to the mixture not possible by agitation alone; and the fourth step is a matter merely of preservation of the mixture. The first two steps, including heating and then reducing the temperature appreciably, accomplish what is known as "pasteurizing", destroying any active organisms present. The product of this method, though hygienically superior to natural or raw milk, possesses a taste and smell quite distinct from those of the raw or natural product—a condition which it has heretofore been attempted to correct, but so far as I am aware without success.

My object is to improve this process and, more generally, to provide a process for the treatment of milk and certain milk products, such as dried milk and skimmed milk, whose product shall in every material respect be superior to the raw product and yet possess a taste and smell not different from those of the raw product.

Proceeding, now, to describe my invention in detail, and particularly, first, in respect to the rehabilitation of dried milk as liquid milk: A mixture of 31 lbs. of butter, 80 lbs. of dried milk and 700 lbs. of water is first placed in a suitable vessel, and, maintained at a temperature of approximately 120° F., is melted and thoroughly agitated by some suitable expedient with a view to break up the butter into as fine particles or globules of fat as possible and secure the highest possible degree of uniformity of their diffusion throughout the mixture, for a reason already explained. Next, the temperature having been appreciably reduced and the mixture agitated at that temperature the mixture is emulsified or homogenized, say in the way already explained, this having the effect of raising the temperature of the mixture to approximately 110° F. So far, the improved process is substantially identical to that already known and above outlined. I now introduce the following novel steps responsible for the improved product accomplished by my invention. The mixture (which leaves the homogenizing or emulsifying apparatus at approximately 110° F.) is placed next in a suitable vessel and is reduced to the materially lower temperature of approximately 90° F., being further agitated, if desired. Either while the mixture is cooling or after it has reached the temperature last named I find it helpful to aerate the mixture, though this is not essential. Thereupon, the mixture is subjected again to the emulsifying or homogenizing operation at substantially the same pressure as before. The mixture is then cooled to a temperature of approximately 35° F., corresponding to the last step in the old process already described. Finally, it is preferable to aerate the mixture again and then store it for twenty-four hours or longer at 35° F. The product of this process will be found to have a taste and smell undistinguishable from those of the raw or natural product, being otherwise, of course, in every respect equal to the produce of the old process, first described.

I may proceed in the same way and, instead of using water and dried milk, use skimmed milk; thus: a mixture of 31 lbs. of butter and 780 lbs. of skimmed milk. The result will be the same as that of the improved process as first described, to wit, whole milk of 3% butter-fat standard.

Proceeding in the same way I may also produce cream, (1) either by using a mixture of 166 lbs. of butter, 55 lbs. of dried milk and 660 lbs. of water; or (2) 166 lbs. of butter and 715 lbs. of skimmed milk; or (3) 124 lbs. of butter and 700 lbs. of whole (raw) milk, the product in each case being cream of 16% butter-fat standard.

The essential feature of my invention, whereby the improved taste and smell result, is the emulsifying or homogenizing in a process otherwise of substantially the nature of that first described herein, at a temperature of approximately 90° F.

The temperatures and quantities and other details herein mentioned are chosen with reference to producing the several products in conditions found by me to be the best, but they may be varied without departure from the invention.

Having thus fully described my invention, what I claim and desire to secure by Letters Patent is:

1. The herein-described process consisting in agitating a liquid mixture containing butter-fat and milk at a suitable temperature and meanwhile reducing the temperature appreciably; then subjecting the mixture to the emulsifying operation substantially as herein described; then cooling the mixture appreciably; then, while the mixture is substantially at the temperature at which it was when last cooled, again subjecting the mixture to the emulsifying operation substantially as herein described; and then cooling the mixture to a temperature suitable for the preservation thereof, substantially as described.

2. The herein-described process consisting in agitating a liquid mixture containing butter-fat and milk at a suitable temperature and meanwhile reducing the temperature appreciably; then subjecting the mixture to the emulsifying operation substantially as herein described; then cooling the mixture appreciably and aerating the same; then, while the mixture is substantially at the temperature at which it was when last cooled, again subjecting the mixture to the emulsifying operation substantially as herein described; and then cooling the mixture to a temperature suitable for the preservation thereof, substantially as described.

In testimony whereof I affix my signature in presence of two witnesses.

ERNST F. W. WIEDA.

Witnesses:
JOHN W. STEWARD,
WM. D. BELL.